Nov. 7, 1944.   A. ROBERTSON   2,362,160
BULKHEAD CLIP FOR WIRES AND CONDUITS
Filed Sept. 14, 1943

Inventor
ARCHIBALD ROBERTSON
Attorney

Patented Nov. 7, 1944

2,362,160

UNITED STATES PATENT OFFICE 2,362,160

BULKHEAD CLIP FOR WIRES AND CONDUITS

Archibald Robertson, North Hollywood, Calif., assignor to Adel Precision Products Corp., a corporation of California Application September 14, 1943, Serial No. 502,339

7 Claims. (Cl. 248—56)

This invention relates to devices for supporting wires, conduits and like lines in shipbuilding where such lines are passed through openings in bulkheads and it is desirable to secure such lines against movement relative to the bulkhead as well as to afford an added support therefor at the bulkhead, so that derangement, chafing, wear and damage of the lines are prevented.

An object of my invention is to provide a device of the character described which is of simple and inexpensive "one-piece" construction subject to being readily and easily mounted in the bulkhead opening through which the line is to be extended and secured to the bulkhead without the use of extraneous fastenings and in a much more expeditious manner than heretofore.

Another object is to provide a clip or support of the character described which is fixed to the bulkhead so that thereafter the line may be extended through the clip and bulkhead and the clip then clamped on the line in an efficacious manner by reason of the construction of the particular one-piece formation and the integral and bendable fastening tongues thereon.

Another object of my invention is to provide a bulkhead clip of the character described which may be readily stamped from a blank of sheet metal as a "one-piece" unit requiring only the addition of a nut and bolt to clamp the device to the conduit or other line.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Figure 1:
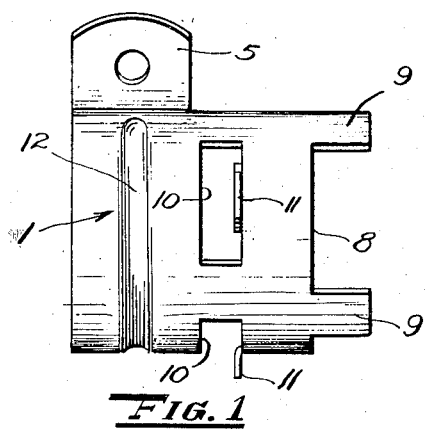
Fig. 1 is a side elevation of a clip embodying the present invention.
Figure 2:
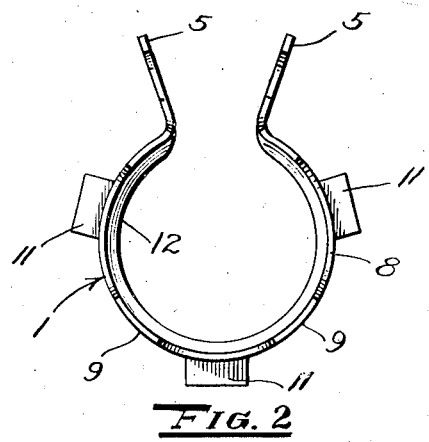
Fig. 2 is an end elevation of the clip.

As shown in the accompanying drawing, one embodiment of the clip of the present invention is made in one piece from suitable resilient sheet metal or similar material in the form of an elongated and longitudinally split sleeve 1 adapted to embrace a conduit or line 2 and to be secured in the opening 3 of the bulkhead 4, through which opening the conduit or line is extended.

Adjacent one end of the sleeve 1 are outwardly extended opposed apertured ears or lugs 5 formed integral with the sleeve at the opposed edges of the split and adapted to be drawn together by means of a bolt 6 and nut 7 to clamp the sleeve on the conduit.

At the other end of the sleeve 1, rectangular recesses or cut-outs 8 are made to define a plurality of bendable tongues 9 which normally extend axially and as continuation portions of the sleeve.

Figure 3:
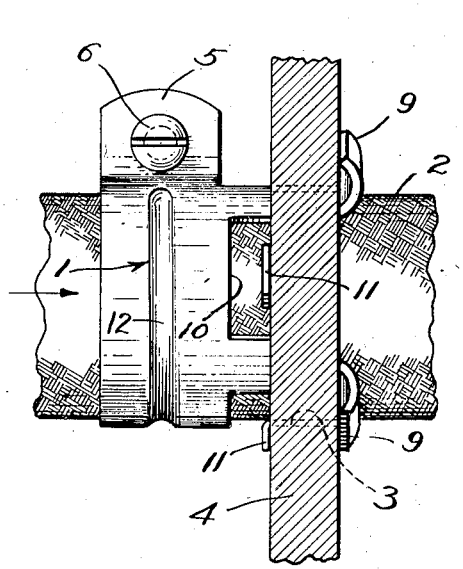
Fig. 3 is a side elevation of the clip as installed in a bulkhead to support and secure a conduit.
Figure 4:
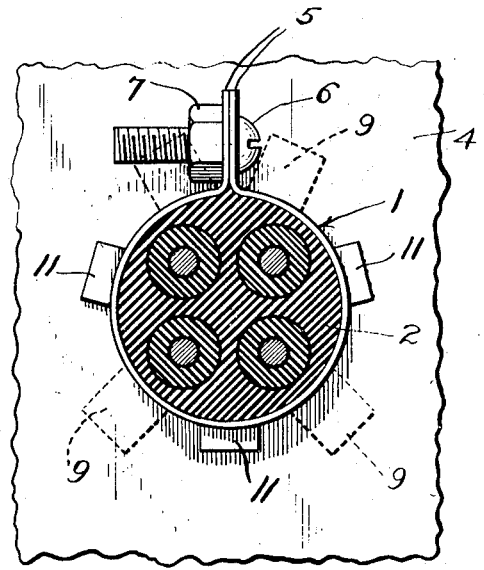
Fig. 4 is an end elevation of the installed clip looking in the direction of the arrow in Fig. 3 and showing the conduit in cross section.

Between the inner ends of the tongues 9 and the ears 5 are rectangular openings 10 which extend circumferentially of the sleeve to lighten it and also provide material for forming radially extending stop lugs 11 adapted to engage one side of the bulkhead as shown in Figs. 3 and 4. When the sleeve is inserted through the bulkhead opening 3 and the lugs 11 abut the bulkhead to limit this extension of the sleeve, the tongues 9 are bent outwardly to extend radially of the sleeve like the lugs 11 except that they are preferably bowed and will engage the other side of the bulkhead with a spring action like a lock washer, thereby holding the clip against rotation or other movement in the bulkhead. When said bowed tongues are properly positioned, only their outer ends engage the bulkhead, which causes them to perform their spring action with maximum efficiency.

Figure 5:
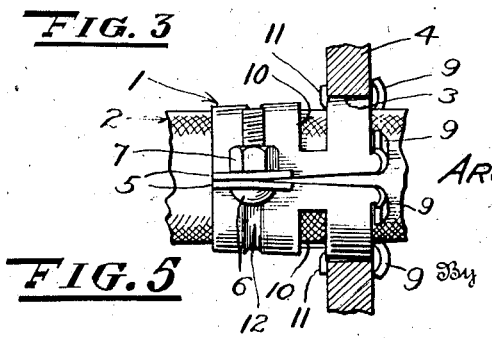
Fig. 5 is a fragmentary top plan view of the clip as installed.

The sleeve 1 may be first inserted and then affixed in the bulkhead opening 3 after which the conduit is extended therethrough and the bolt 6 tightened to clamp the outer end portion of the sleeve on the conduit. As a conduit or line is usually covered with rubber or yieldable or compressible material, the clamped end of the sleeve, due to its length and the longitudinal split, will be constricted to a greater extent than the end in the opening 3. This causes the sleeve to take a conical form somewhat as shown by slight exaggeration in Fig. 5, with the larger or base end of the cone snugly fitted in the opening 3. With the clip thus installed the conduit is held securely against longitudinal movement relative to the bulkhead and effectively supported on a wide and long wear preventing seat afforded by the sleeve 1.

The clip serves as an effective anchoring and supporting means for a conduit line or wires and positively prevents movement of the line relative to the bulkhead.

The stop lugs 11 provide for a quick application of the clip to the bulkhead and insure the proper positioning thereof in the opening 3 to likewise permit of a ready bending of the tongues 9 into the holding position shown in Fig. 3.

Another feature of importance assuring a comparatively snug fit of the clip in the bulkhead opening and a reliable holding of the conduit line or wires in the desired position, is the provision for constricting the outer portion of the sleeve which carries the clamping ears 5 so that it has a smaller diameter than the portion of the sleeve resting in the bulkhead opening, this being made possible by the resiliency of the sleeve, its elongation and the longitudinal split thereof, whether the conduit is rigid or yieldably compressible.

As here shown the sleeve 1 may be provided on its longitudinal median line with a rib 12 which aids in holding the cable, conduit line or wires against longitudinal movement relative to the sleeve, as said rib will bite into the cable or other line and therefore securely grip and hold the line when the sleeve is clamped thereon.

While I have shown and described a specific embodiment of my invention I do not limit myself to the exact details of construction set forth, and the invention embraces such changes, modifications and equivalents of the parts and their formation and arrangement as come within the purview of the appended claims.

I claim:

1. In a clip for supporting a conduit or other line which passes through an opening in a bulkhead, an elongated longitudinally split sleeve adapted to embrace the line to be supported thereby and to have one end extended through the opening in the bulkhead, stop means extending radially outward from a point intermediate the ends of the sleeve for engaging one side of the bulkhead to limit the extension of said one end through said bulkhead, tongues normally extending axially from said one end and bendable to extend radially of the sleeve and engage the other side of the bulkhead to secure the sleeve thereto, and clamping means on the portion of the sleeve which is between the other end thereof and said stop means for constricting said portion and clamping it on said line.

2. In a clip for supporting a conduit or other line which passes through an opening in a bulkhead, an elongated longitudinally split sleeve adapted to embrace the line to be supported thereby and to have one end extended through the opening in the bulkhead, stop means extending radially outward from a point intermediate the ends of the sleeve for engaging one side of the bulkhead to limit the extension of said one end through said bulkhead, tongues normally extending axially from said one end and bendable to extend radially of the sleeve and engage the other side of the bulkhead to secure the sleeve thereto, clamping means on the portion of the sleeve which is between the other end thereof and said stop means for constricting said portion and clamping it on said line, including opposed ears extending from the sleeve at the opposed edges of the longitudinal slit, and fastening means for moving said ears toward one another.

3. In a clip for supporting a conduit or other line which passes through an opening in a bulkhead, an elongated longitudinally split resilient sleeve adapted to embrace the line to be supported thereby and to have one end extended through the opening in the bulkhead, stop means extending radially outward from a point intermediate the ends of the sleeve for engaging one side of the bulkhead to limit the extension of said one end through said bulkhead, tongues normally extending axially from said one end and bendable to extend radially of the sleeve and engage the other side of the bulkhead to secure the sleeve thereto, and clamping means on the portion of the sleeve which is between the other end thereof and said stop means for constricting said portion and clamping it on said line.

4. In a clip for supporting a conduit or other line which passes through an opening in a bulkhead, an elongated longitudinally split sleeve adapted to embrace the line to be supported thereby and to have one end extended through the opening in the bulkhead, stop means extending radially outward from a point intermediate the ends of the sleeve for engaging one side of the bulkhead to limit the extension of said one end through said bulkhead, tongues normally extending axially from said one end and bendable to extend radially of the sleeve and engage the other side of the bulkhead to secure the sleeve thereto, clamping means on the portion of the sleeve which is between the other end thereof and said stop means for constricting said portion and clamping it on said line, and a rib on the inner surface of said sleeve for embracing and contacting the conduit or other line.

5. In a clip for supporting a conduit or other line which passes through an opening in a bulkhead, an elongated longitudinally split sleeve adapted to embrace the line to be supported thereby and to have one end extended through the opening in the bulkhead, stop means extending radially outward from a point intermediate the ends of the sleeve for engaging one side of the bulkhead to limit the extension of said one end through said bulkhead, tongues normally extending axially from said one end and bendable to extend radially of the sleeve and engage the other side of the bulkhead to secure the sleeve thereto, and clamping means on the portion of the sleeve which is between the other end thereof and said stop means for constricting said portion and clamping it on said line, said tongues being arcuately bent and so positioned that only their outer ends will contact the bulkhead and the tongues will have a spring action to hold the sleeve against turning in the bulkhead.

6. In a clip for supporting a conduit or other line which passes through an opening in a bulkhead, an elongated longitudinally split sleeve adapted to embrace the line to be supported thereby and to have one end extended through the opening in the bulkhead, stop means intermediate the ends of the sleeve carried thereby for engaging one side of the bulkhead to limit the extension of said one end through said bulkhead, tongues normally extending axially from said one end and bendable to engage the other side of the bulkhead to secure the sleeve thereto, and opposed apertured ears on the portion of the sleeve which is between the other end thereof and said stop means for constricting said portion and clamping it on said line.

7. In a clip for supporting a conduit or other line which passes through an opening in a bulkhead, an elongated longitudinally split sleeve adapted to embrace the line to be supported thereby and to have one end extended through the opening in the bulkhead, stop means intermediate the ends of the sleeve carried thereby for engaging one side of the bulkhead to limit the extension of said one end through said bulkhead, tongues extending from said one end for engaging the other side of the bulkhead to secure the sleeve thereto, and opposed apertured ears on the portion of the sleeve which is between the other end thereof and said stop means for constricting said portion and clamping it on said line.

ARCHIBALD ROBERTSON.